Sept. 21, 1937. G. B. GALLASCH ET AL 2,093,605
OBJECTIVE MOUNT
Filed Oct. 26, 1934

GEORGE B. GALLASCH
HENRY F. KURTZ
INVENTOR

BY *G. A. Ellestad*
ATTORNEY

Patented Sept. 21, 1937

2,093,605

UNITED STATES PATENT OFFICE 2,093,605

OBJECTIVE MOUNT

George B. Gallasch and Henry F. Kurtz, Rochester, N. Y., assignors to Bausch & Lomb Optical Company, Rochester, N. Y., a corporation of New York Application October 26, 1934, Serial No. 750,171

12 Claims. (Cl. 88—39)

The present invention relates to microscopes and more particularly to objective mounts for binocular microscopes.

Heretofore it has been the practice to use circular objective lenses for binocular microscopes. For high power work such objectives must be of very small diameter so that the proper spacing between their axes may be obtained. Small lenses of this type require a large amount of light and give a poor image definition. The necessary amount of light may be reduced and the image improved by using larger lenses and cutting off the adjacent edges to permit the proper spacing of the lens axes. A binocular objective of this latter form requires a new type of lens mount.

One of the objects of the present invention is to provide a new and improved objective mount for binocular microscopes which is rugged and durable in structure yet simple in operation. Another object is to provide an objective mount in which adjustment is accomplished without rotating the lenses. A further object is to provide an objective mount in which accidental disturbances of adjustment of the lenses are substantially eliminated. These and other objects and advantages reside in certain novel features of construction, arrangement and combinations of parts as will hereinafter be more fully described and pointed out in the appended claims.

Referring to the drawing.

Figure 1:
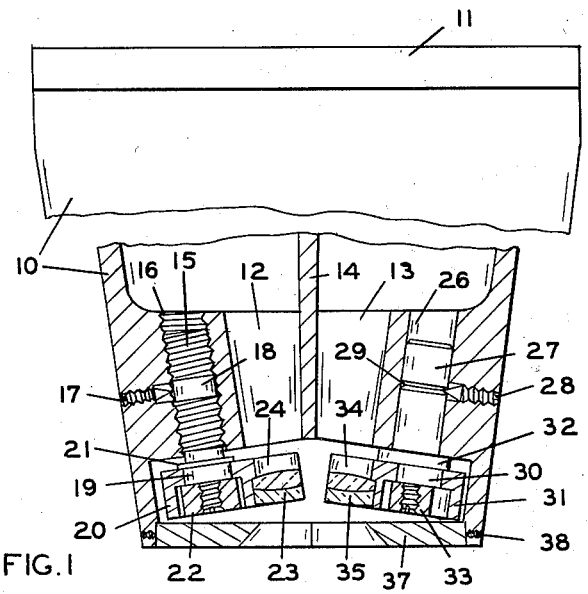
Fig. 1 is a front elevation of our device with parts in vertical section.

One embodiment of our invention is shown in the drawing wherein 10 indicates the body of the objective mount having flanges 11 adapted to fit in a dovetail slot on the microscope. The objective mount 10 is provided with two converging light tubes 12 and 13 separated by a septum 14. An adjusting and supporting screw 15 having a slot 15' is threaded in a bore 16, which is adjacent and parallel to the light tube 12, and is held in adjusted position by a set screw 17 which engages an unthreaded section 18 on the screw 15. The lower end of the screw 15 has a smooth cylindrical portion 19 rotatably supporting the lens carrier 20 which is held against longitudinal movement on the screw 15 by a shoulder 21 and a nut 22. A lens 23 is mounted in a bore 24 in the lens carrier 20 in alignment with the light tube 12 and a pair of set screws 25 serve to hold the lens 23 in proper alignment.

Adjacent and parallel to the light tube 13 is a smooth bore 26 in which the supporting shaft 27 having a slot 27' is rotatably mounted. A set screw 28, cooperating with a circular groove 29 in the shaft 27, holds the shaft against longitudinal movement within the bore 26. The lower end of the shaft 27 has an eccentric cam portion 30 upon which the lens carrier 31 is rotatably mounted. The lens carrier 31 is held against longitudinal movement on the eccentric cam portion 30 by a shoulder 32 and a nut 33. The lens carrier 31 has a bore 34 at its outer end for carrying a lens 35 which is aligned with the light tube 13 by set screws 36.

Figure 2:
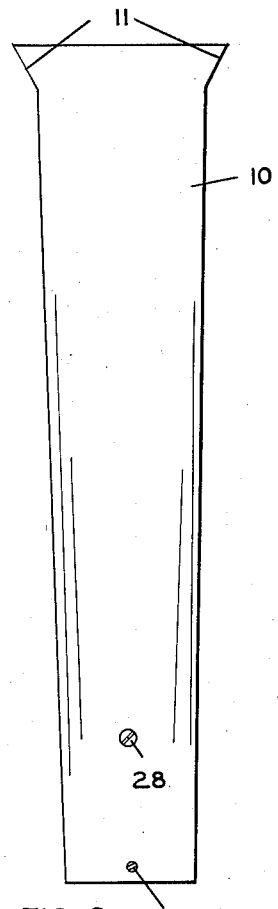
Fig. 2 is a side elevation of same.
Figure 3:
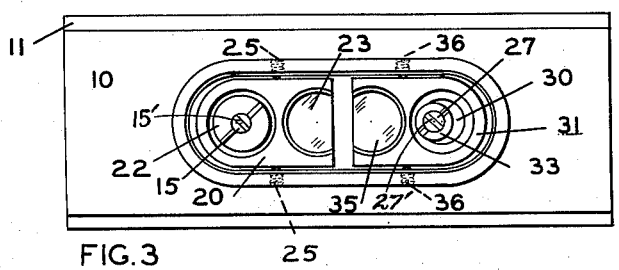
Fig. 3 is a bottom plan view of same with the cover plate removed.

The objective illustrated in Figs. 1 to 3 is for high power work, and the lens 23 and the lens 35 each has a segment removed on the side adjacent the other lens. The lens carriers 20 and 31 are cut off so that the respective bores 24 and 34 enclose only the circular portions of the lenses 23 and 35 as shown.

Figure 4:
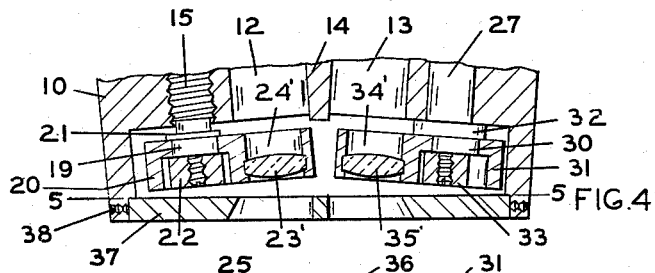
Fig. 4 is a fragmentary vertical section of a modified form of our invention.
Figure 5:
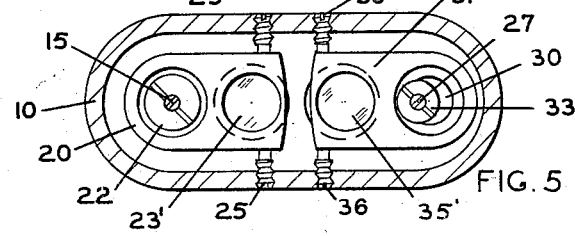
Fig. 5 is a section taken on line 5—5 of Fig. 4.

In the modification shown in Figs. 4 and 5, the lenses 23' and 35' are of longer focal length than the lenses 23 and 35 and can be made of the conventional form. The mount for such lenses is identical with that for the high power lenses except that the bores 24' and 34' completely surround the lenses 23' and 35' respectively. It is thus apparent that our improved lens mount is suitable for supporting lenses of any size or shape in a binocular microscope objective.

In using our improved lens mount, the supporting and adjusting screw 15 is turned until the lens 23 is focused in the same plane as the lens 35. The set screw 17 is then tightened to prevent further movement of the screw 15. The lens 35 is then moved toward or from the lens 23 by means of the eccentric cam 30 until both lenses cover the same field. The set screws 25 and 36 are used to maintain the axes of both lenses and of both light tubes in a single plane.

After the lenses have been focused and adjusted, a cover plate 37 is fastened to the body 10 by screws 38 to prevent any further movement of the lenses by rendering the lens adjusting means inaccessible.

From the foregoing it is apparent that we attain the objects of our invention and provide an improved objective mount for binocular microscopes. Various modifications can, of course, be made without departing from the spirit of our invention.

We claim:

1. An objective mount for a binocular microscope comprising a body having two light tubes inclined toward each other, a threaded bore adjacent one tube, a member threaded in said bore, an objective lens rotatably carried by said member, a smooth bore adjacent the other of said tubes, a member rotatably mounted in said smooth bore, a second objective lens and cam means connecting said last-named member and said second objective.

2. A binocular objective assembly comprising a body member, a support longitudinally adjustably mounted on said body member, a lens carrier pivotally mounted on said support, a second support rotatably mounted on said body member, an eccentric on said second support, a second lens carrier pivotally mounted on said eccentric whereby rotation of said support moves said carrier transversely, and means for pivoting each of said carriers about its support.

3. A binocular objective assembly having convergent light paths comprising a body member, two lenses, means for mounting one of said lenses on said body member for axial movement whereby said lenses can be made to focus in a single plane, pivot means for pivotally mounting the other lens on said body member for transverse movement whereby the axes of said lenses may be located in a single plane, and means for moving said pivot means toward and from the first-mentioned lens whereby the convergent optical axes of said lenses may be made to cross in the plane of focus.

4. An objective mount for a binocular microscope comprising a body having two light tubes inclined toward each other, two bores, one adjacent and parallel to each light tube, a support secured in each bore, two lens carriers, one on each support, two lenses one in each lens carrier in axial alignment with the adjacent light tube, means for moving one of said carriers along a line parallel to the axis of the adjacent light tube and means for moving the other of said carriers transversely of the axis of the adjacent light tube.

5. An objective mount for a binocular microscope comprising a body having two light tubes inclined toward each other, two bores, one adjacent and parallel to each light tube, a support secured in each bore, two lens carriers pivotally mounted one on each support, two lenses one in each lens carrier in axial alignment with the adjacent light tube, and means for pivoting each carrier about its support.

6. An objective mount for a binocular microscope comprising a body having two light tubes inclined toward each other, two bores, one adjacent and parallel to each light tube, a support secured in each bore, two lens carriers pivotally mounted one on each support, two lenses one in each lens carrier in axial alignment with the adjacent light tube, means for moving one of said carriers along a line parallel to the axis of the adjacent light tube, means for moving the other of said carriers transversely of the axis of the adjacent light tube and means for pivoting each carrier about its support.

7. An objective mount for a binocular microscope comprising a body having two light tubes inclined toward each other, two bores, one adjacent and parallel to each light tube, a support secured in each bore, two lens carriers, one carried by each support, two lenses one in each lens carrier in axial alignment with the adjacent light tube, means for moving one of said carriers along a line parallel to the axis of the adjacent light tube, and means for moving the other of said carriers transversely of the axis of the adjacent light tube.

8. An objective mount for a binocular microscope comprising a body having two light tubes inclined toward each other, a threaded bore adjacent and parallel to one of said light tubes, a screw threaded in said bore, a lens carrier rotatably mounted on said screw, means for holding said lens carrier against longitudinal movement, a lens in said carrier in axial alignment with the adjacent light tube, means for rotating said screw, a smooth bore adjacent and parallel to the other of said light tubes, a shaft rotatably mounted in said smooth bore, means for holding said shaft against axial movement in said tube, an eccentric portion on said shaft, a second lens carrier rotatably mounted on said eccentric portion, a second lens in said second carrier in axial alignment with the adjacent light tube, and means for rotating said shaft.

9. An objective mount for a binocular microscope comprising a body having two light tubes inclined toward each other, a threaded bore adjacent and parallel to one of said light tubes, a screw threaded in said bore, a lens carrier rotatably mounted on said screw, means for holding said lens carrier against longitudinal movement, a lens in said carrier in axial alignment with the adjacent light tube, means for rotating said screw, a smooth bore adjacent and parallel to the other of said light tubes, a shaft rotatably mounted in said smooth bore, means for holding said shaft against axial movement in said tube, an eccentric portion on said shaft, a second lens carrier rotatably mounted on said eccentric portion, a second lens in said second carrier in axial alignment with the adjacent light tube, means for rotating said shaft, means for pivoting the first-named lens carrier about the screw and means for pivoting the second-named lens carrier about the eccentric portion of the shaft.

10. An objective mount for a binocular microscope comprising a body, a pair of adjacent parallel bores in said body, a support in one bore of said pair, a carrier on said support, a lens in said carrier in axial alignment with the other bore of said pair, a second pair of adjacent parallel bores inclined relatively to the first pair of bores, a second support in one bore of said second pair, a second carrier on said second support and a second lens in said second carrier in alignment with the other of said second pair of bores.

11. An objective mount for a binocular microscope comprising a body, a pair of adjacent parallel bores in said body, a support in one bore of said pair, a carrier on said support, a lens in said carrier in axial alignment with the other bore of said pair, a second pair of adjacent parallel bores inclined relatively to the first pair of bores, a second support in one bore of said second pair, a second carrier on said second support, a second lens in said second carrier in alignment with the other of said second pair of bores, and means for moving one of said supports axially.

12. An objective mount for a binocular microscope comprising a body, a pair of adjacent parallel bores in said body, a support in one bore of said pair, a carrier pivotally mounted on said support, a lens in said carrier in axial alignment with the other bore of said pair, a second pair of adjacent parallel bores inclined relatively to the first pair of bores, a second support in one bore of said second pair, a second carrier pivotally mounted on said second support, a second lens in said second carrier in alignment with the other of said second pair of bores, and means for pivoting each of said carriers about its support.

GEORGE B. GALLASCH.
HENRY F. KURTZ.